No. 623,123. Patented Apr. 18, 1899.
S. R. BAILEY.
PERCH CONNECTION FOR CARRIAGES.
(Application filed Dec. 14, 1898.)
(No Model.)
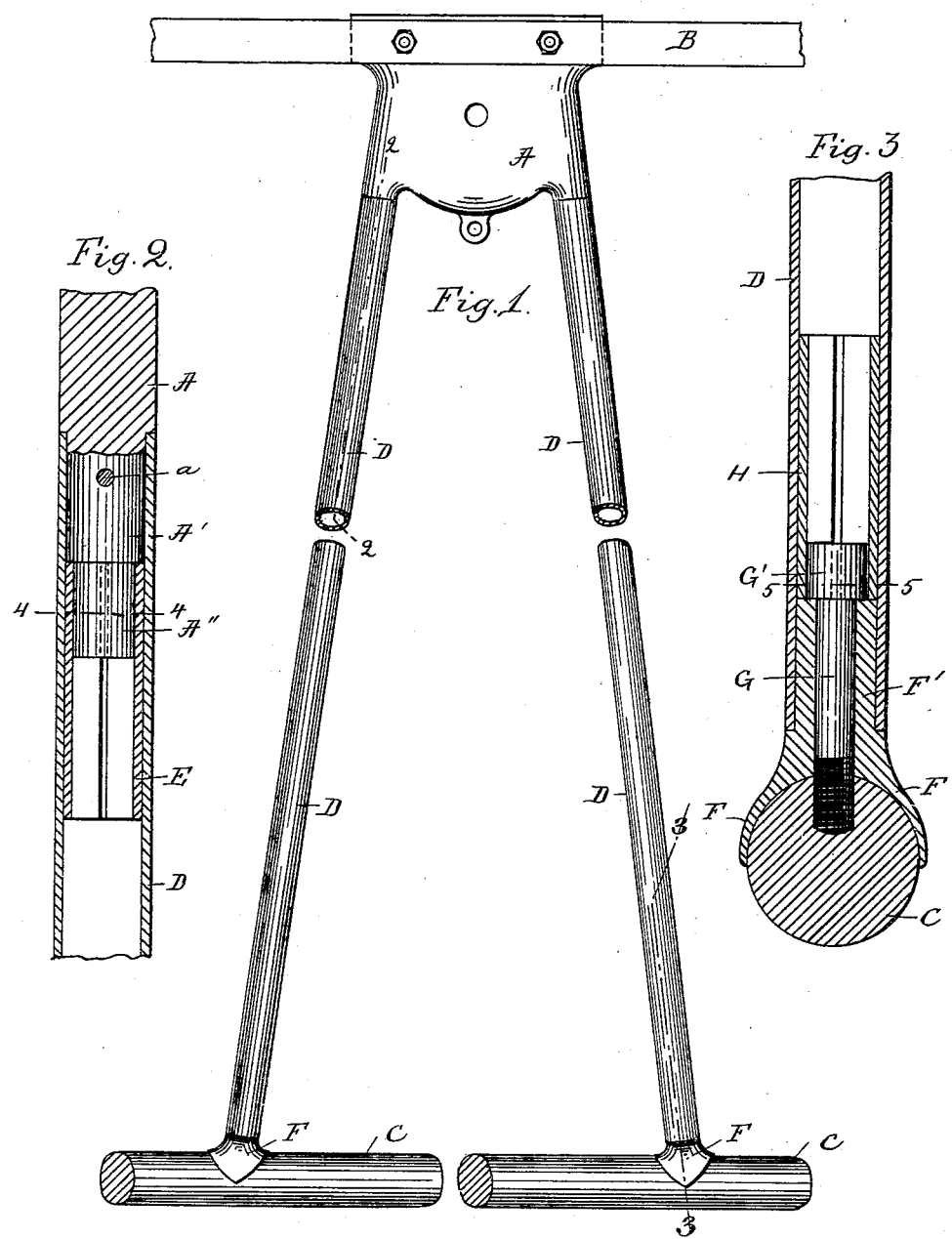

UNITED STATES PATENT OFFICE.

SAMUEL R. BAILEY, OF AMESBURY, MASSACHUSETTS.

PERCH CONNECTION FOR CARRIAGES.

SPECIFICATION forming part of Letters Patent No. 623,123, dated April 18, 1899.

Application filed December 14, 1898. Serial No. 699,198. (No model.)

*To all whom it may concern:*

Be it known that I, SAMUEL R. BAILEY, a citizen of the United States, residing at Amesbury, in the county of Essex and State of Massachusetts, have invented new and useful Improvements in Perch Connections for Carriages, of which the following is a specification.

This invention relates to improvements in perch connections for carriages; and it has for its object to firmly secure the ends of the tubular metal perches respectively to the fifth-wheel and rear axle, as will hereinafter be more fully shown and described, reference being had to the accompanying drawings, wherein—

Figure 1 represents a top plan view of the perches and the rear axle and fifth-wheel of a carriage to which they are connected. Fig. 2 represents an enlarged longitudinal section on the line 2 2, shown in Fig. 1. Fig. 3 represents an enlarged longitudinal section on the line 3 3, also shown in Fig. 1. Fig. 4 represents a cross-section on the line 4 4, shown in Fig. 2; and Fig. 5 represents a cross-section on the line 5 5, shown in Fig. 3.

Similar letters refer to similar parts wherever they occur on the different parts of the drawings.

In the drawings, A represents the top part or cap portion of a metal fifth-wheel of a carriage, and B represents the spring secured in a suitable manner to such fifth-wheel portion.

C represents the rear axle of the carriage, as usual.

D D represent the tubular metal perches, which are secured firmly to the fifth-wheel portion A and rear axle C in a manner as will hereinafter be described. For the purpose of securing the forward end of each perch to the fifth-wheel portion A, I make on the latter, preferably integral with it, a cylindrical trunnion A' (one for each perch) of a diameter equal to the interior bore of the perch. In practice I prefer to make the end of such trunnion slightly reduced in diameter, as shown at A'' in Fig. 2, over which is slipped a preferably slitted reinforcing metal sleeve E, (shown in Figs. 2 and 4,) which sleeve serves to strengthen the union between the perch end and the trunnion on the fifth-wheel portion A, thus preventing any liability to breakage at such place of connection.

The parts after being placed in position, as shown in Fig. 2, are brazed together, preferably, by suitable hard alloy or solder, by which they are effectively secured and united together. In practice I prefer to temporarily secure the perch end to the trunnion A' during the brazing operation by means of a pin $a$, going through perforations in said trunnion and perch, as shown in Fig. 2; but this is not essential, as they may be held together during the brazing operation in any other suitable or equivalent manner. Although I prefer to use the reinforcing-sleeve intermediate between the shank or trunnion on the fifth-wheel portion and the perch, I wish to state that I may, if so desired, dispense with such reinforcing-sleeve without departing from the essence of my invention of securing the front ends of the perches to the fifth-wheel portion.

For the purpose of securing the rear ends of the perches to the axle C, I proceed as follows: I make use of a curved metal clip F, adapted to fit around a part of the axle, as shown in Figs. 1 and 3. In one piece with such clip is made a tubular shank F', adapted to receive upon it the rear end of the tubular perch D, as shown in Fig. 3. The said shank and clip are preferably secured to the axle by means of a screw-bolt G, which passes loosely through the centrally-perforated shank F' and is screwed into a screw-threaded perforation in the axle C, as represented in Fig. 3.

G' is an enlarged head at the upper end of the screw-bolt G, which serves to confine the shank F' and clip F in position on the axle C when the said screw-bolt is screwed home relative to said axle, as shown in Fig. 3.

Although I prefer to screw the bolt G into the axle, as shown in Fig. 3, I wish to state that it may be simply driven into a perforation therein, or, if so desired, the said bolt may be made integral with the clip without departing from the essence of my invention.

In practice I prefer to interpose between the bolt-head G' and the interior of the tubular perch D a preferably-slitted reinforcing metal sleeve H for a purpose similar to that of the reinforcing metal sleeve E on the shank A''; but if so desired I may dispense with such reinforcing-sleeve without departing from the spirit of my invention.

After the clip F has been secured by means of the screw-bolt G to the axle C and the end of the tubular perch D placed around the shank F' the parts are brazed together by a suitable hard solder or alloy, by which a firm and secure union between the parts is obtained.

Having thus fully described the nature, construction, and operation of my invention, I wish to secure by Letters Patent and claim—

1. The herein-described perch connection for securing one end of a carriage-perch to the fifth-wheel, consisting in combination, a shank or trunnion on the fifth-wheel adapted to be received in the tubular perch, a reinforcing-sleeve arranged intermediate between said shank and perch and securing said parts by brazing them together, substantially as and for the purpose set forth.

2. The herein-described perch connection for securing one end of a carriage-perch to the axle, consisting of a metal clip F adapted to fit the carriage-axle and having a shank F' secured to the axle by means of a screw bolt or pin, a tubular perch adapted to receive the said clip-shank and securing said parts by brazing them together, substantially as and for the purpose set forth.

3. The herein-described perch connection for securing one end of a carriage-perch to the axle consisting of a metal clip F adapted to fit the carriage-axle and having a shank F' and a screw bolt or pin for securing said parts to the axle, a perch fitting around said shank and a reinforcing-sleeve arranged intermediate between the perch and the head of the fastening-bolt and securing said parts by brazing them together, substantially as and for the purpose set forth.

In testimony whereof I have hereunto set my hand in presence of two subscribing witnesses.

SAMUEL R. BAILEY.

Witnesses:
ALBAN ANDRÉN,
KARL A. ANDRÉN.